though the temperature would be even higher than this preferred range, as in some secondary reformers, lower hydrocarbons may be split to carbon and hydrogen by thermal cracking. At the higher temperatures, the ultrafine or sub-micron size carbon, or "soot", particles that are formed also tend to be a particulate material whose removal or prevention of buildup on the outer surface of the porous walls is facilitated by the subject invention.

United States Patent [19]
Kaplan

[11] Patent Number: 4,464,350

[45] Date of Patent: Aug. 7, 1984

[54] PARALLEL PASSAGE GAS TREATING PROCESS

[75] Inventor: Milton L. Kaplan, Morton Grove, Ill.

[73] Assignee: UOP Inc., Des Plaines, Ill.

[21] Appl. No.: 450,302

[22] Filed: Dec. 16, 1982

[51] Int. Cl.³ .................... B01J 8/00; C01B 17/00; C01B 21/00

[52] U.S. Cl. ................................ 423/244; 423/239; 55/73

[58] Field of Search .......... 423/244 A, 244 R, 239 A, 423/239; 55/73

[56] References Cited

U.S. PATENT DOCUMENTS

| | | | |
|---|---|---|---|
| 3,501,897 | 3/1970 | Van Helden et al. | 423/244 |
| 3,747,308 | 7/1973 | Versluis et al. | 55/387 |
| 4,102,980 | 7/1978 | Sasaki et al. | 423/239 |
| 4,193,972 | 3/1980 | Pohlenz | 423/244 |
| 4,258,020 | 3/1981 | Ginger | 423/239 A |

FOREIGN PATENT DOCUMENTS 197707  7/1977  U.S.S.R. .......................... 423/244 R

*Primary Examiner*—Gregory A. Heller
*Attorney, Agent, or Firm*—James R. Hoatson, Jr.; John F. Spears, Jr.; William H. Page, II

[57] ABSTRACT

A gas treating process using parallel passage contactors is disclosed. A turbulence-inducing means, such as vortex shedding wires or strips, is employed within the planar gas passages of the contactors to generate turbulence which helps remove or prevent the accumulation of fine particles on the outer surface of the porous walls which define the gas passages.

10 Claims, 3 Drawing Figures

PARALLEL PASSAGE GAS TREATING PROCESS

FIELD OF THE INVENTION

The invention relates to a process for treating gas streams which contain undesired chemical compounds. The invention more directly relates to a gas treating process in which such pollutants as sulfur dioxide and/or nitrogen oxides are removed from a particulate-containing flue gas stream produced by the combustion of carbonaceous fuels including coal. The invention specifically relates to a gas treating process in which a parallel passage contactor is employed, with the gas treating particles being retained between porous screens along which the gas travels through a thin planar gas passage.

PRIOR ART

The use of parallel passage contactors to treat gas streams is a well developed process. It is described in some detail in U.S. Pat. No. 3,501,897 issued to H. J. A. VanHelden et al. This reference provides a description of both operating conditions and suitable apparatus and treating particles used in the apparatus. U.S. Pat. No. 3,747,308 issued to R. Versluis et al is pertinent for showing the construction of parallel passage contactors of the type employed in the subject process.

Parallel passage contactors were developed for the purpose of treating particle laden gases. The gases do not flow through layers of the treating particles but rather contact the treating particles after diffusing through the porous walls which retain the acceptors or catalyst employed in the process. The particles present in the gas are therefore not filtered from the gas and do not accumulate on the porous walls. Nevertheless, due to the changes in fuel combustion, treating process operating and possibly other conditions, a layer of fine particles has been observed to sometimes form on the porous walls. This is confirmed by the teaching of U.S. Pat. No. 4,102,980 issued to T. Sasaki et al and U.S. Pat. No. 4,193,972 issued to J. B. Pohlenz. These patents are pertinent for showing a recognition of the problem of ash accumulation on the surface of the walls of the parallel passage contactors. Both references attack this problem by admixing additional particulate material into the gas stream, with the added particles colliding with and dislodging the accumulated fine material.

BRIEF SUMMARY OF THE INVENTION

The invention provides a process for treating particle laden gas streams in a parallel passage contactor. This treating process eliminates or at least reduces the accumulation of fine particles on the surface of the contactors. These accumulations are undesirable since they hinder the transmission of the gas into the body of the contactor thereby leading to lower operating performance. In the subject process, additional localized turbulence is generated by passing the gas stream across a vortex shedding wire or similar means within the gas passage of the contactor.

A broad embodiment of the process may be characterized as comprising the steps of passing a gas stream through planar passages located between porous walls of solids-filled gas treatment packages at treatment-promoting conditions which include a gas velocity sufficient to maintain turbulent flow; and creating additional turbulence within the passages by passing the gas stream across turbulence-inducing means comprising elongated members located within the passages at locations between the porous walls and aligned parallel to the porous walls.

DETAILED DESCRIPTION

Figure 1:
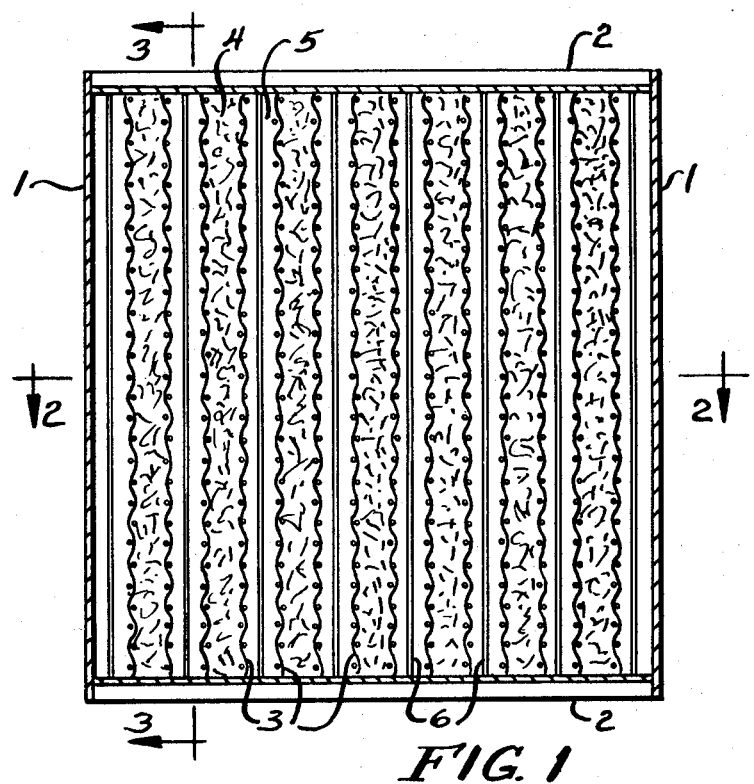
FIG. 1 is a cross-section along a vertical plane through an apparatus which may be used to perform the subject process and illustrates the turbulence-inducing wires 6 located in the planar gas passages 5.
Figure 2:
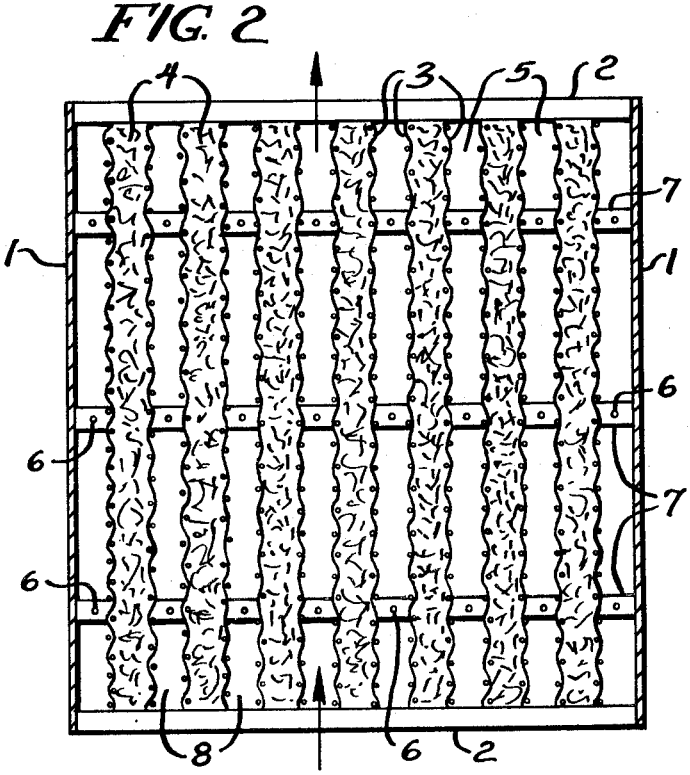
FIG. 2 is a cross-section along a horizontal plane through the apparatus of FIG. 1 and shows the catalyst beds 4 contained between the screens 3.

Parallel passage reactors have proven successful as contactors for treating flue gas streams containing small particles such as fly ash. These contactors do not normally become fouled by the accumulation of the particles on their porous walls and may therefore be used continuously for long periods of time without requiring maintenance or cleaning. These contactors derive their name from the fact that the main flow of the gas being treated is parallel to the porous wall retaining the treating particles. That is, the gas stream flows along the wall rather than into it. A slow transfer of gas through the wall, as by diffusion, brings the gas to be treated into contact with the treating particles without filtering the gas stream.

The success of these contactors is due in part to the maintenance of a linear gas velocity along the wall (through the planar gas passage) which is just slightly above the transition range from laminar to turbulent flow. However, significant changes in the operation of the flue gas source occur rather frequently due to such factors as a change in the fuel or changes in the "load" or operating rate required of the flue gas source. The result of these changes include temporary reductions in the gas velocity through the planar gas passages of the contactors and changes in the characteristics of the fly ash. These changes can promote the accumulation of fine fly ash or soot particles on the outer surface of the contactors. This hinders the diffusion of gas through the porous surface of contactors thereby reducing the overall reaction rates and reactor capacity.

It is an objective of the subject invention to provide an improved gas treating process. It is a further objective of the subject invention to provide a process for removing sulfur dioxide and/or nitrogen oxides from flue gas streams produced by the combustion of coal or fuel oil. It is a specific objective of the invention to lessen or eliminate the deposition of fine particles on the outer surfaces of the porous walls of parallel passage contactors used to treat particle-containing flue gas streams.

The construction of parallel passage contactors is well described in the available references. The subject invention is directed to those parallel passage contactors which have planar reactant passages similar to those shown in FIG. 1 of previously cited U.S. Pat. No. 3,501,897 and in U.S. Pat. No. 3,747,308, which was also previously cited. These gas passages are flat volumes located between the opposing walls of two adjacent acceptor packages or cells. Each gas passage has a width, measured perpendicular to the porous walls, of from about 3 to about 50 mm and preferably from about 5 to 10 mm (0.20 to 0.39 inch). This relatively small distance is uniform throughout an individual gas passage, which is preferably located between porous walls which measure about one meter square. This area size allows rapid and convenient mass fabrication of the contactors, with the gas stream being directed through several passages in series to achieve any desired total reactor capacity.

The parallel passage contactors preferably comprise a plurality of adjacent catalyst packages separated from each other by the planar gas passages. Each catalyst package preferably has two parallel porous walls, with each wall thereby forming one side of a different gas passage. The distance between the porous walls of an individual catalyst package is from about 1 to 25 mm, which results in a relatively thin catalyst bed having a shape similar to that of the gas passages. Alignment of the catalyst packages in a parallel relationship separated by the gas passages, located between walls of each pair of adjacent contactors, results in a contactor structure which comprises alternating passages and catalyst packages. Preferably each of these structures contains about 20 to 50 passages and catalyst packages to result in a box-like structure having outer dimensions which are approximately equal, on all three sides, to the length of the square porous walls of the individual catalyst packages. Similar structures are shown in the previously cited references, and further details may be obtained from these references. The gas stream being treated will normally pass through several of these structures in series.

The structural arrangement of parallel passage contactors may be observed by reference to the previously cited patents and by a review of the drawing. The contactor presented in the drawing is representative of apparatus which may be employed to perform the subject process but is not to scale and is not intended as a working drawing. In actual contactors, the width of the gas passages and of the treating particle beds is much less, which is difficult to present while retaining detail on an illustration of this nature. Referring now to FIG. 1 of the drawing, the box-like contactor is formed from two thin sideplates 1 which form imperforate sides of the contactor. Horizontal cross braces 2 extend between the sideplates at the top and bottom of the contactor. The vertical porous screens 3 divide the internal volume between the sideplates into alternating catalyst or acceptor beds 4 and flat gas passages 5.

Figure 3:
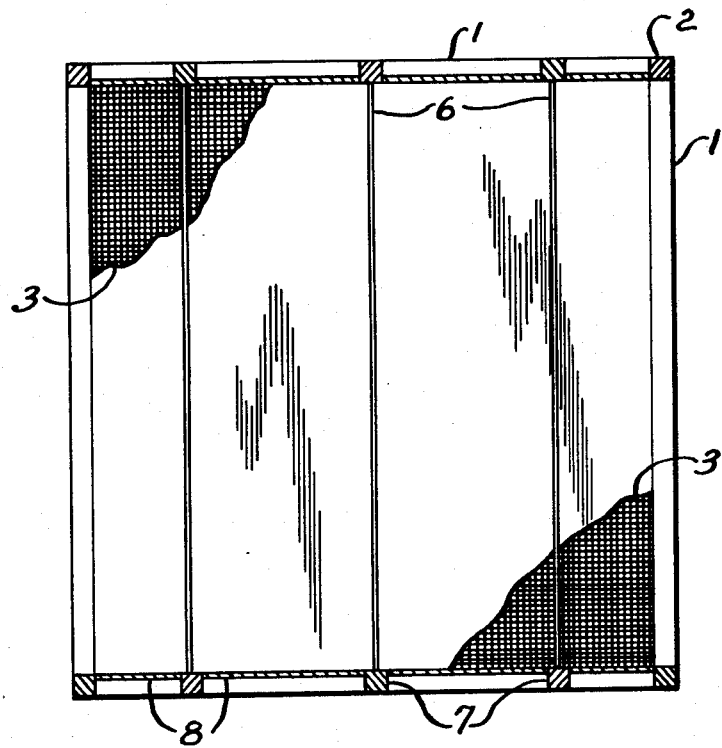
FIG. 3 is a second vertical cross-section of the apparatus taken along a plane perpendicular to the vertical plane of FIG. 1 and shows three turbulence-inducing wires 6 in front of a porous screen 3.

FIG. 3 illustrates how the upper and lower outer surface of the contactor may be enclosed by the sealplates 8 to prevent gas from bypassing the gas passages. The sideplates and sealplates may not be required depending on the structure of the other support members and the manner in which the modular contactors used in the process are arranged or stacked and enclosed within the outer structure of the total gas treating zone. The turbulence-inducing wires 6 extend between upper and lower retaining bars 7 which extend between the sideplates. The vertical orientation of the screens is preferred to prevent entrained particles from settling onto the horizontal surface which would result from a horizontal orientation.

The porous walls of the catalyst packages are preferably formed by woven wire mesh, with other wall constructions and other materials being usable if they may withstand the chemical, thermal and mechanical stresses present in the contacting zone and provide adequate porosity. The openings in the porous walls should be the maximum size which still ensures retention of the catalyst or acceptor particles. The openings may, for example, be between about 0.07 and about 0.85 mm across. Preferably, the openings are in the range of from about 0.074 to 0.250 mm. The solid treating particles (catalyst and/or acceptors) preferably fill the entire volume of each catalyst package in a dense non-moving bed which hinders vibration or other agitation which could induce catalyst fracture or wear. This treating particle bed has a width equal to the distance between the porous walls of the respective catalyst package. This distance is preferably between 3 and 10 mm.

The conditions employed in operating the subject process preferably include a linear gas velocity through the passages of the contactor which is just above the threshold into turbulent flow conditions. High velocities result in increased turbulence but also lead to undesired higher pressure drops. This is the velocity of the reactant through the gas passage in a direction parallel to the surface of the porous wall and in no way refers to the rate of gaseous diffusion or passage through the porous wall. Linear gas velocities of from about 2 to about 20 meters/second may be employed, with linear gas velocities above 10 meters/second being preferred. A low pressure drop through the process is normally desired since any pressure drop adversely affects the performance of utility boilers and power plants, etc. which are expected to be the major source of the flue gas being treated. The pressure drop through an entire contacting zone, which normally contains several parallel passage contactors arranged for series flow, should be less than 20 inches of water and preferably is less than 12 inches of water and most preferably is between about 1 and 4 inches of water. Although low pressure drops are desired, the gas flow rate should be sufficient to at least minimize the settling out of particles entrained in the gas stream or the deposition of these particles on the outer surface of the porous walls of the catalyst packages.

In the subject process, the gas stream being treated is passed across one or more turbulence-inducing elements located in the gas passages between the porous walls. This is to produce additional turbulence by disturbing the flow of the gas stream. This localized turbulence will take the form of swirling gas currents which depart from the normal direction of gas flow to impact upon the porous wall in a sweeping manner which dislodges accumulated very fine particles or prevents their initial deposition. The turbulence-inducing means of the subject process is preferably in the form of a vortex shedding ribbon or wire located in the middle third of the distance across the gas passage. Preferably the vortex shedding elements are aligned parallel to the porous walls and perpendicular to the direction of gas flow. The turbulence-inducing elements should be quite thin to avoid serious obstruction of the gas flow and therefore preferably have a maximum width less than 30 percent of the distance across the planar gas passages. More preferably the vortex-inducing means is in the form of a wire having a diameter less than 15 percent of the distance across the gas passage. More than one turbulence-inducing means may be located within each gas passage, with these separate elongated members located at different distances between the inlet and the outlet of the individual gas passages. The turbulence-inducing means may have different profiles or cross-sectional shape than the preferred round wire and can be square, rectangular, triangular, ribbon-like, etc. A wire of about 1 mm diameter is preferred. This wire would stretch the entire "height" of the gas passage and therefore could be up to about 30 feet in length.

A preferred embodiment of the invention may accordingly be characterized as a process for treating gas streams which comprises the steps of passing a flue gas stream comprising sulfur dioxide and nitrogen dioxides and which is formed by the combustion of a carbonaceous fuel into a gas treatment zone and through planar passages located between porous walls of gas treatment packages containing solid sulfur dioxide acceptor particles and nitrogen dioxide-ammonia reaction catalyst at treatment-promoting conditions which include a gas velocity sufficient to maintain turbulent flow; and creating additional turbulence within the passages by causing the gas stream to contact turbulence-inducing means located within the passages, with the turbulence-inducing means comprising elongated members which are substantially parallel to the porous walls and which leave a majority of the passage unobstructed. In this embodiment the subject process is employed to simultaneously remove sulfur dioxide and reduce nitrogen oxides. However, the subject process may be employed with equal effectiveness to just remove sulfur dioxide from the feed gas stream or to just effect the reduction of nitrogen oxides to nitrogen.

The operating pressure of the process will be set by the pressure of the gas stream being treated. As the preferred feed gas stream is a flue gas stream from a combustion zone, the operating pressure will normally be quite low, usually less than 50 psig. A preferred operating pressure range is from about 10 to about 20 psia. The operating temperature of the process will be set by the temperature required for successful utilization of the catalyst or acceptors present in the planar catalyst packages and by the effect of the operating temperature on the economics of the process which produces the gas stream being treated. For the acceptance of sulfur dioxide from a flue gas stream through the use of copper-containing acceptor particles, a temperature from about 300° C. to about 475° C. is normally employed. A preferred range of acceptance temperatures is from 325° to 425° C. Other acceptors or catalyst will have different optimum operating temperatures, and the subject process can be operated at virtually any temperature to adapt to the usage of these differing treating particles.

In addition to keeping the surfaces of the porous walls free of fine particle accumulation, the increased turbulence caused in the subject process will decrease the thickness of the stagnant layer of gas next to the porous wall. This will increase the rate of gas transfer through the wall and thereby speed the reaction rate when it is limited by gas transfer rates. This is an additional advantage to employing the subject invention in a gas treating process.

By proper tensioning and judicious design, the turbulence-inducing (vortex shedding) wire may be made to resonate due to contact with the fast moving gas stream. To achieve this, the vortex shedding wire is tensioned and sized such that its resonant frequency is within about 80–120% of the vortex shedding frequency. The amplitude of this vibration may be sufficient to vibrate the porous walls or to cause the wire to impact against the porous walls, thereby aiding in removing or preventing the accumulation of fine particles.

The treating particles employed in the process may function as acceptors and/or as catalysts. For instance, the preferred copper-containing treating particles function as acceptors when they remove sulfur oxide from the gas stream. This results in copper present in the treating particles being converted to copper sulfate, which is an excellent catalyst for promoting the reduction of nitrogen oxides to nitrogen. This reaction occurs in the presence of a reductant which is mixed into the gas stream at a point upstream of the contactors. A preferred reductant is ammonia. The subject process can be employed when the treating particles of the solids-filled packages are utilized solely as catalysts. An example of this is the use of the parallel passage contactors to only reduce nitrogen oxides, as might be performed when another process is being utilized to remove sulfur oxides or when the flue gas stream is being produced by a low sulfur fuel which renders flue gas desulfurization unnecessary. This reduction may be performed at the previously described conditions of temperature and pressure.

The preferred treating particles for sulfur dioxide removal comprise copper on a refractory inorganic support. This support may be chosen from various materials including clays, bauxite, silica, alumina and silica-alumina mixtures. The preferred support is gamma-alumina. The support preferably has a large surface, above 100 m$^2$/g, and a pore volume of 0.30–0.60 ml/g. Surface areas of 160–230 m$^2$/g are highly suitable. The finished acceptor may contain from about 1 to 25 wt.% copper, with from 5 to 15 wt.% copper being preferred. The acceptors can be made by normal methods such as impregnation of the carrier in an aqueous solution of a copper salt followed by drying and calcination. Other acceptors may be employed such as those containing an alkali metal promoted with a vanadium compound or those disclosed in U.S. Pat. Nos. 4,170,627; 4,105,745 and 3,987,146. The copper on alumina acceptors are preferred for sulfur dioxide removal since they allow regeneration at the same operating conditions, which eases implementation of the regeneration procedure and promotes long useful acceptor lifes. Regeneration may be performed by terminating the acceptance mode and passing a reducing gas such as hydrogen, $C_1$–$C_3$ hydrocarbons or carbon monoxide through the gas passages. This results in the release of sulfur dioxide, which may then be recovered as described in U.S. Pat. No. 4,041,131. The acceptors are then contacted with an oxygen-containing gas to return any elemental copper or copper sulfide to copper oxide, which is the active sulfur dioxide removing form of the metal. Flue gases usually are effective gases for use in this oxidizing step. Further details on acceptor-catalyst manufacture, process operation and acceptor regeneration are available from many sources including the previously cited references.

If the subject process is utilized only for the reduction of nitrogen oxides then it is preferred that a reduction catalyst comprising vanadium as an active catalytic component and a titanium oxide support is employed as the treating particles. Preferably the catalyst contains less than 15 wt.% vanadium oxide and also contains tungsten oxide in an amount less than 5 wt.%. These treating particle catalysts may also contain molybdenum, iron, nickel, cobalt and chromium. Further details on the preparation and usage of suitable nitrogen oxide reduction catalysts of this type may be obtained by reference to U.S. Pat. No. 4,085,193.

I claim as my invention:

1. A process for treating particle and sulfur dioxide containing gas streams which comprises the steps of:
   (a) passing the gas stream through planar passages located between porous walls of adjacent solids-filled gas treatment packages filled with a sulfur dioxide acceptor at treatment-promoting conditions which include a gas velocity sufficient to maintain turbulent flow; and to remove sulfur dioxide from the gas the stream,
   (b) creating additional turbulence within the passages by passing the gas stream across turbulence-inducing means comprising elongated members located within the passages at locations between the porous walls and aligned parallel to the porous walls.

2. The process of claim 1 further characterized in that the sulfur dioxide acceptor comprises copper.

3. The process of claim 1 further characterized in that the gas treatment packages contain solid particles which comprise at least one active catalytic component chosen from the group consisting of vanadium, tungsten, iron, cobalt and nickel.

4. The process of claim 1 further characterized in that the elongated members of the turbulence-inducing means have a maximum width less than 30 percent of the distance across the passages located between adjacent gas treatment packages.

5. The process of claim 3 further characterized in that the gas stream contains nitrogen oxides which are reduced to nitrogen by passage through the planar passages.

6. A process for treating gas streams formed by combustion of a carbonaceous fuel and containing sulfur dioxide which comprises the steps of:
   (a) passing the flue gas stream into a gas treatment zone and through planar passages located between porous walls of gas treatment packages containing solid sulfur dioxide acceptor particles at treatment-promoting conditions which include a gas velocity sufficient to maintain turbulent flow; and to remove sulfur dioxide from the flue gas stream and,
   (b) creating additional turbulence within the passages by causing the gas stream to contact turbulence-inducing means located within the passages, with the turbulence-inducing means comprising elongated members which are substantially parallel to the porous walls and which leave a majority of the passage unobstructed.

7. The process of claim 6 further characterized in that the flue gas stream contains nitrogen oxides and a gaseous reductant for the nitrogen oxides is admixed into the flue gas stream.

8. The process of claim 6 further characterized in that the elongated members of the turbulence-incuding means have a maximum width less than 30 percent of the distance across the planar passages.

9. The process of claim 8 further characterized in that the sulfur oxide acceptors comprise copper or a copper compound supported by a refractory inorganic oxide base material.

10. The process of claim 9 further characterized in that the flue gas stream is produced by the combustion of coal.

* * * * *